Figure 1:
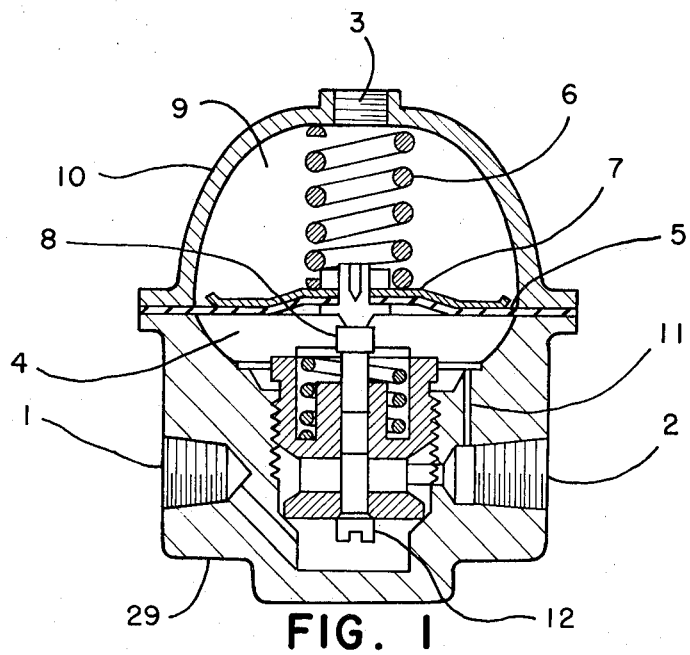

United States Patent [19]
Bergson

[11] 3,795,260
[45] Mar. 5, 1974

[54] THREE WAY VALVE FOR FLOW REGULATOR CONNECTED TO MOISTURE ANALYZER

[76] Inventor: Gustav Bergson, Cedarbrook Hill Apts. B-117, Wyncote, Pa. 19095

[22] Filed: Sept. 27, 1972

[21] Appl. No.: 297,133

[52] U.S. Cl. .............................. 137/599, 137/501
[51] Int. Cl. ............................................. G05d 16/06
[58] Field of Search ....... 137/110, 501, 599, 625.32

[56] References Cited
UNITED STATES PATENTS

| | | | |
|---|---|---|---|
| 2,272,684 | 2/1942 | Vickers | 137/501 X |
| 1,679,561 | 8/1928 | Cantrell | 137/625.32 X |
| 1,186,147 | 6/1916 | Syakas | 137/599 X |
| 1,593,601 | 7/1926 | Rush | 137/599 X |

Primary Examiner—Robert G. Nilson
Attorney, Agent, or Firm—Jackson, Jackson & Chovanes

[57] ABSTRACT

A three way valve having ports No. 1, No. 2 and No. 3 is connected to a flow regulator for a moisture analyzer. Port No. 1 is the inlet port for gas. Port No. 2 is connected to the inlet of the flow regulator. Port No. 3 is connected to the outlet of the flow regulator before a needle valve which connects to the moisture analyzer. The three way valve has two positions. In one position it is connected from port No. 1 to port No. 2 and port No. 3 is closed. In the other position it is connected from port No. 1 to port No. 3 and port No. 2 is closed.

1 Claim, 5 Drawing Figures

THREE WAY VALVE FOR FLOW REGULATOR CONNECTED TO MOISTURE ANALYZER

The invention presents a simple and economical means for including the benefits of flow regulation in an electrolytic moisture analyzer, when recording, with their elimination during batch measurement at which time it is desirable to eliminate the transient effects introduced by the flow regulator for maximum speed of measurement. Since, during batch measurements an operator is always present to set the flow there is no loss by eliminating the flow regulator.

The measurement of trace moisture in the parts per million range using an electrolytic moisture analyzer invented by Dr. Fred Keidel U.S. Pat. No. 2,830,945, has become fairly widespread. The instrument is capable of measurements of the batch type, that is repeated measurements of different samples, and it is capable of continuous measurement of a passing sample with recording. It is fairly common to find it being used for both purposes, occasionally for spot checks and otherwise for continuous recording at a fixed location.

Since stable performance of the electrolytic moisture analyzer requires a constant flow of sample gas through the electrolytic cell, it is necessary to maintain flow regulation when measurements are continuously recorded. On the other hand, in batch measurement, particularly, for example, when cylinders of gas are being tested, speed of measurement is very important and since, under these circumstances, an operator is always at hand, it is no problem to adjust the flow manually to the prescribed value during the measurement. However, the presence of the flow regulator required as it is for recording, now becomes a distinct handicap because of transient effects which are introduced by it, thereby slowing the measurement. It is a purpose of this invention to establish a simple and economic means for obtaining normal flow regulation in the instrument when recording while permitting elimination of the flow regulator during batch measurements.

Figure 2:
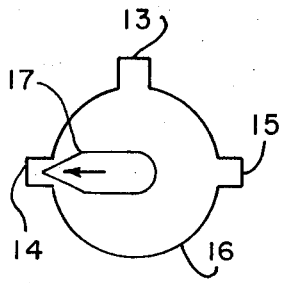
Figure 3:
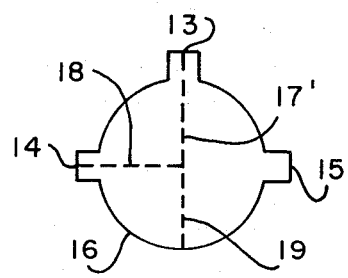
Figure 4:
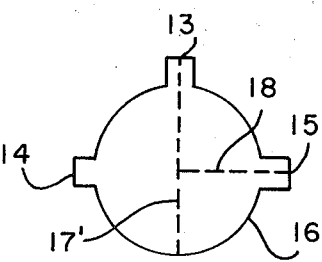

Toward explaining the present invention, use is made of FIGS. 1 to 5 wherein 1 is the body input of flow regulator 2, 2 is the body output, 3 the bonnet connection, 10 the bonnet, 6 a fixed spring, 9 the bonnet gas space, 5 the diaphragm, 7 the diaphragm contact to nozzle stem 8, 12 the nozzle valve, 4 the gas control cavity, 11 the passageway from 11 to 2, all in FIG. 1, while in FIG. 2, the three way valve 16 is shown schematically with inlet port 13 and first and second outlet ports 14 and 15 and with control handle 17, FIGS. 3 shows a schematic representation of gaseous flow paths for the positions of handle 17 of FIG. 2, this being from 13 along ducts 17' and 18 to 14 while FIG. 4 shows the flow path which would correspond to turning handle 17 by 180°, this being from 13 along ducts 19 and 18 to 15.

Figure 5:
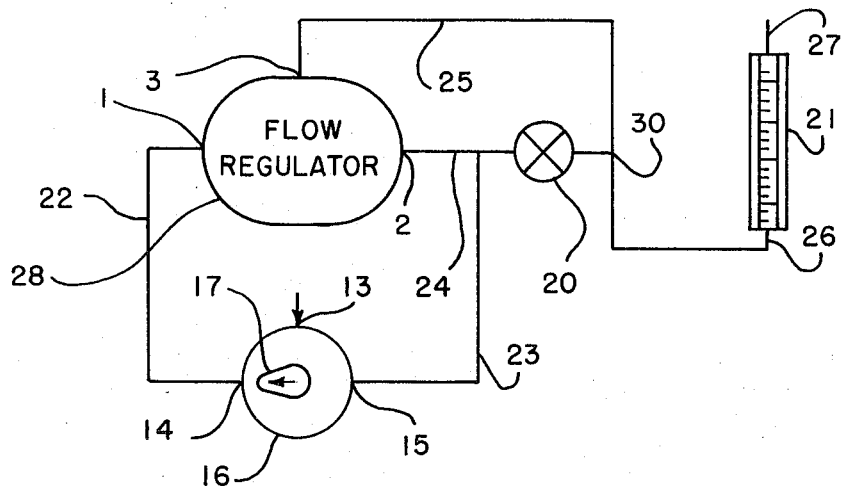

In FIG. 5 gas enters the three way valve 16 at 13 and with handle 17 as shown it passes out 14 and via line 22 to the input 1 to flow regulator 28 whose body output 2 is connected via line 24 to the flow control means (needle valve) 20 having a downstream connection at 30 to bonnet outlet 3 via line 25, and via line 26 to flowmeter 21 which vents at 27. When the handle 17 is turned through 180° the input gas connection to the body input of flow regulator 28 is disconnected and incoming gas connection is made from 13 to 15 of valve 16 then via line 23 to 31 making connection with line 24 to the upstream connection of flow control means 20. Valve 20 is now used as a direct flow control for the gas stream with elimination of flow regulator 28 from the path of flow.

What is claimed is:

1. A gas flow system including a flow regulator having an inlet and an outlet, flow control means connected downstream thereof, and a three-way valving system, said flow regulator being connected to said system as to be responsive to pressure upstream and downstream of the flow control means, said valving system having first, second, and third ports, the first port being connected to an incoming gas stream, the second port being connected to the inlet of said flow regulator, and the third port being connected to a conduit interconnecting the outlet of said flow regulator and the flow control means, whereby switching said three way valveing system in one direction allows passage of gas from its first to its second port with no passage of gas to its third port and switching of said three way valving system in the other direction allows passage of gas from its first to its third port with no passage of gas to its second port.

* * * * *